(12) United States Patent
Hansen et al.

(10) Patent No.: US 9,669,740 B2
(45) Date of Patent: Jun. 6, 2017

(54) VEHICLE HAVING INTERCHANGEABLY STORABLE AND MOUNTABLE STOWABLE FOLDING SEAT AND CENTER CONSOLE

(71) Applicant: Toyota Motor Engineering & Manufacturing North America, Inc., Erlanger, KY (US)

(72) Inventors: Charles S. Hansen, Northville, MI (US); Hamshivraj S. Dhamrat, Saline, MI (US); Andrew E. Lund, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/817,799

(22) Filed: Aug. 4, 2015

(65) Prior Publication Data

US 2017/0036572 A1   Feb. 9, 2017

(51) Int. Cl.
  *B60N 2/30*    (2006.01)
  *B60R 7/04*    (2006.01)

(52) U.S. Cl.
  CPC .  *B60N 2/30* (2013.01); *B60R 7/04* (2013.01)

(58) Field of Classification Search
  CPC ...... B60N 2/3011; B60N 2/005; B60N 2/206; B60N 2/2222; B60N 2/3013; B60N 2/3047; B60N 2/305; B60R 7/043
  USPC ...... 297/378.12, 158.1, 188.04, 188.09, 408; 297/364; 296/64, 65.03, 65.09
  See application file for complete search history.

(56) References Cited

U.S. PATENT DOCUMENTS

| 5,511,853 | A | 4/1996 | Wallis | |
|---|---|---|---|---|
| 5,911,471 | A | 6/1999 | Benedict et al. | |
| 6,955,386 | B2* | 10/2005 | Rhodes | B60N 2/062 296/65.09 |
| 7,393,038 | B2* | 7/2008 | Yajima | B60N 2/01583 296/64 |
| 8,011,714 | B2 | 9/2011 | Parkinson et al. | |
| 2010/0102585 | A1* | 4/2010 | Kato | B60N 2/01508 296/24.34 |
| 2012/0298678 | A1 | 11/2012 | Hanson | |
| 2013/0062903 | A1* | 3/2013 | Mather | B60N 2/2356 296/64 |
| 2014/0015273 | A1* | 1/2014 | Sawada | B60N 2/3011 296/65.09 |

* cited by examiner

*Primary Examiner* — Glenn Dayoan
*Assistant Examiner* — Sunsurraye Westbrook
(74) *Attorney, Agent, or Firm* — Dinsmore & Shohl LLP

(57) ABSTRACT

The vehicle includes a passenger compartment, a seat assembly, a folding seat, and a center console. The passenger compartment includes a storage space. The storage space is provided in an interior side wall of the passenger compartment. The seat assembly is provided in the passenger compartment. The seat assembly includes a mounting base. The folding seat has a seat mounting structure. The folding seat is movable between a folded position and a seated position. The center console has a console mounting structure. The folding seat and the center console are each configured to be stored within the storage space of the passenger compartment. The seat mounting structure of the folding seat and the console mounting structure of the center console are each configured to be mounted to the mounting structure of the seat assembly.

14 Claims, 11 Drawing Sheets

VEHICLE HAVING INTERCHANGEABLY STORABLE AND MOUNTABLE STOWABLE FOLDING SEAT AND CENTER CONSOLE

FIELD OF THE INVENTION

The present invention is directed to a vehicle having a folding seat and a center console that are interchangeably storable and mountable. More particularly, the vehicle includes a folding seat and a center console that are configured to be interchangeably mounted to a mounting base or storable in a storage space.

BACKGROUND OF THE INVENTION

It has been previously known to provide an automotive vehicle with a removable seat that is mountable to a mounting space of a seat assembly within a passenger compartment during use and stowable in a seat storage space that does not occupy any floor or subfloor cargo space as evidenced by U.S. Pat. No. 8,011,714. However, the previously known vehicles having the removable and stowable seat fails to provide additional customization of the vehicle interior. Specifically, once the removable seat has been stored in the seat storage space, the mounting space, in which the removable seat was mounted, remains empty.

Consequently, the known vehicles lack adequate options to provide passengers with the ability to customize the interior passenger compartment. Rather, the previously known vehicles only provide the option of having the removable seat mounted or stowed, with no other option for customization of the unutilized mounting space when the removable seat is stowed.

Thus there exists a need in the art to improve a consumer's customization of the interior of a vehicle so as to provide additional options in the configuration of the passenger compartment.

SUMMARY OF THE INVENTION

The present invention provides a vehicle which overcomes the above mentioned disadvantages of the previously known vehicles by providing a folding seat and a center console that are interchangeably mountable or storable within the interior of the vehicle.

In brief, the vehicle includes a passenger compartment, a seat assembly, a folding seat, and a center console. The passenger compartment includes a storage space. The storage space is provided in an interior side wall of the passenger compartment. The seat assembly is provided in the passenger compartment. The seat assembly includes a mounting base. The folding seat has a seat mounting structure. The folding seat is movable between a folded position and a seated position. The center console has a console mounting structure.

The folding seat and the center console are each configured to be stored within the storage space of the passenger compartment. The seat mounting structure of the folding seat and the console mounting structure of the center console are each configured to be mounted to the mounting structure of the seat assembly.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

The present invention has utility as a vehicle which allows a user to customize the interior of a passenger compartment by selecting whether to install a folding seat or a center console into a seat assembly and storing the other of the folding seat or center console in a storage space. By providing the vehicle with both a folding seat and a center console that is configured to mount to the mounting base of the seat assembly and to be stored within the storage space allows a user to customize the vehicle interior to suit different needs. Specifically, the user can select to mount the folding seat for additional seating or mount the center console for additional storage while storing the other of the folding seat or the center console in the storage space so as to not occupy any floor or subfloor cargo space.

Moreover, by providing a frame that is common to both the folding seat and the center console allows a single mounting configuration of a seat assembly mounting base to accommodate both the folding seat and the center console. Further, the use of a common frame reduces part differentiation while increasing part commonality of the vehicle.

Figure 1A:
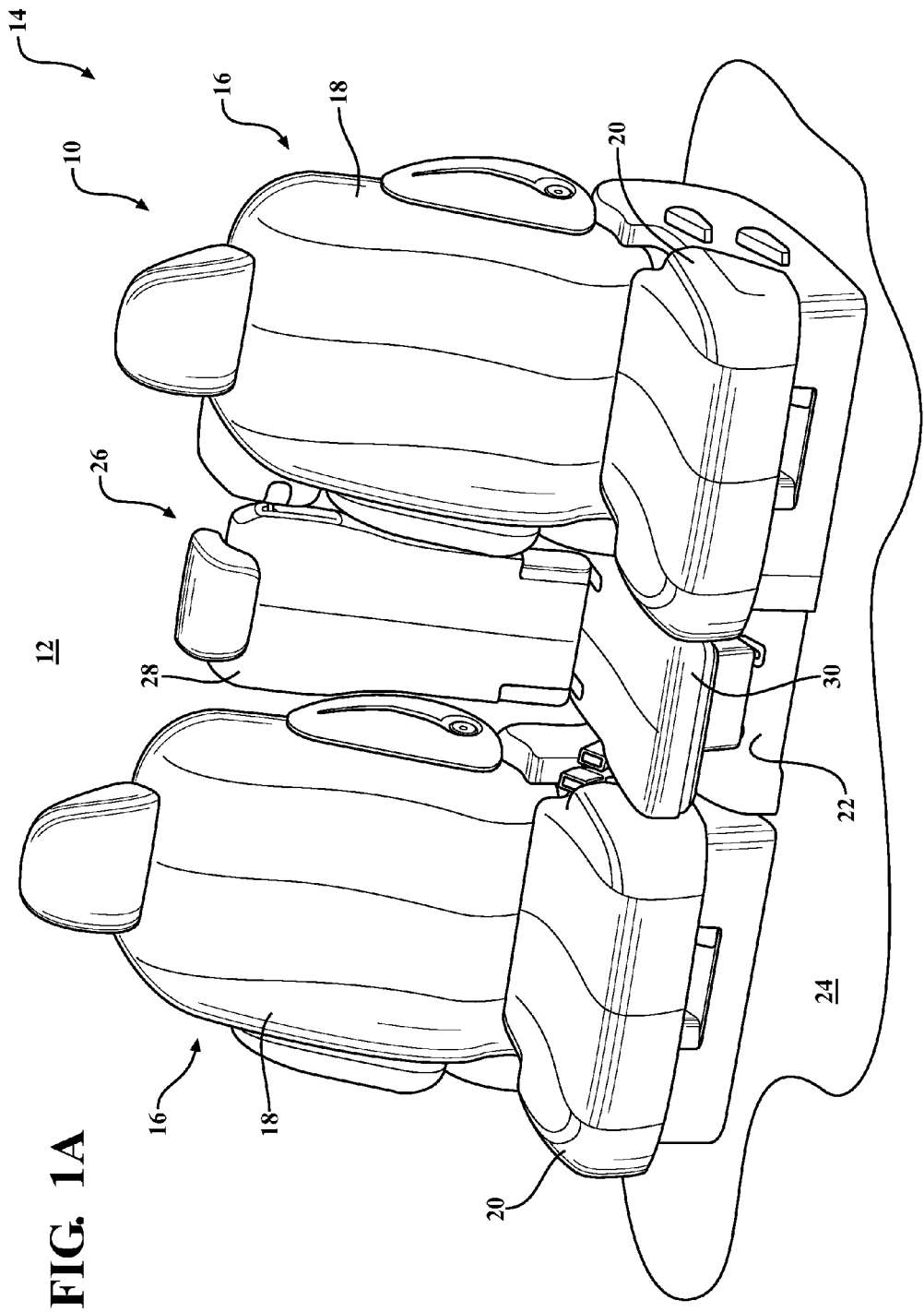
FIG. 1A is a front view of a seat assembly with the folding seat installed.
Figure 1B:
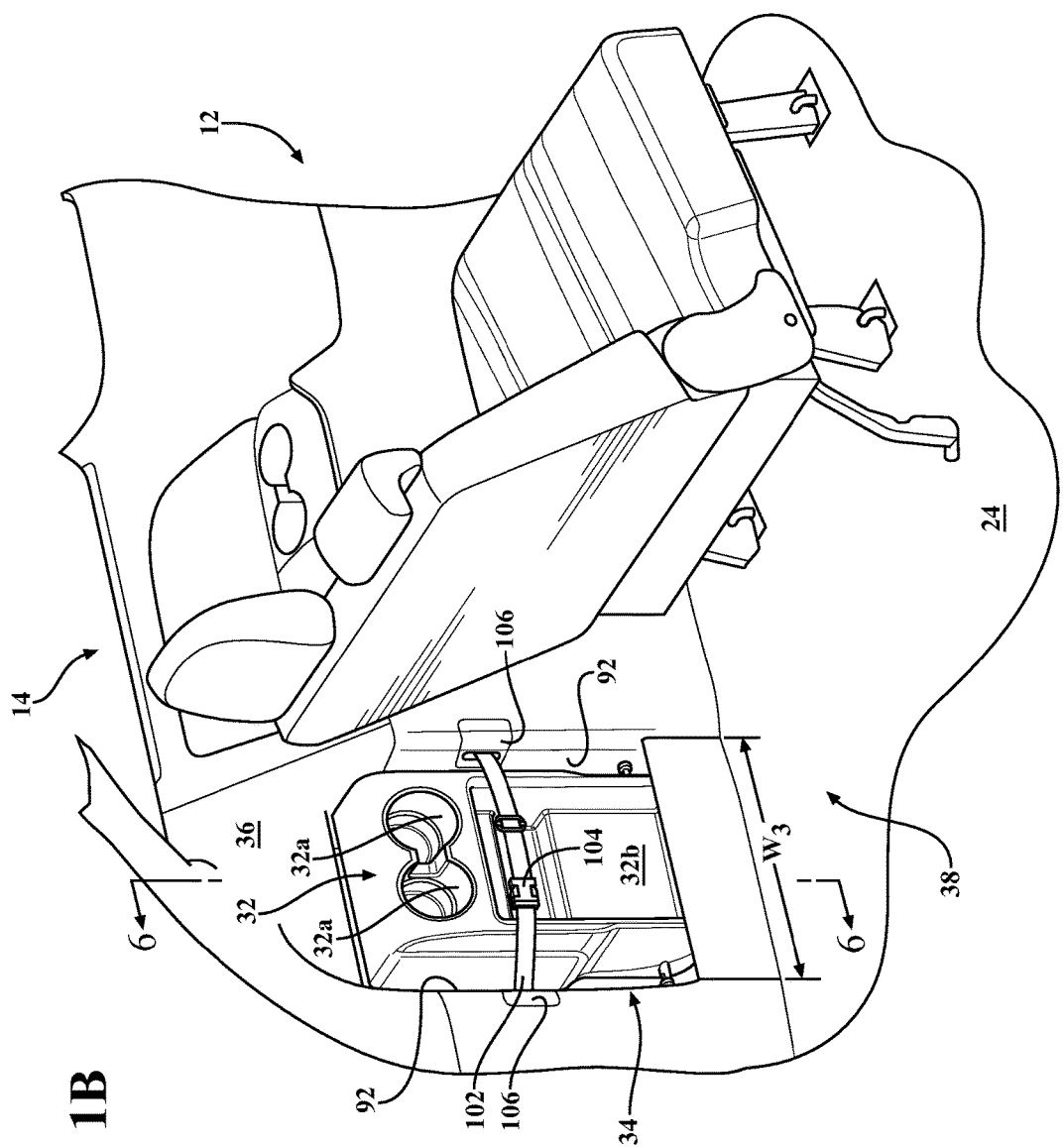
FIG. 1B is a perspective view of the storage space with the center console installed.

As illustrated in FIG. 1A, a seat assembly is generally illustrated at 10. The seat assembly 10 is provided within a passenger compartment 12 of an automotive vehicle 14, as seen in FIG. 1B. The seat assembly 10 includes a pair of seats 16 including seatbacks 18 and seat cushions 20. The seats 16 are attached to a mounting base 22, specifically the seat cushion 20, which is releasably or fixedly secured to a vehicle floor 24. The seats 16 can be a front row seat, a back row seat, and the like. Specifically, the seat assembly 10 can be a second row seat or a third row seat.

Figure 7:
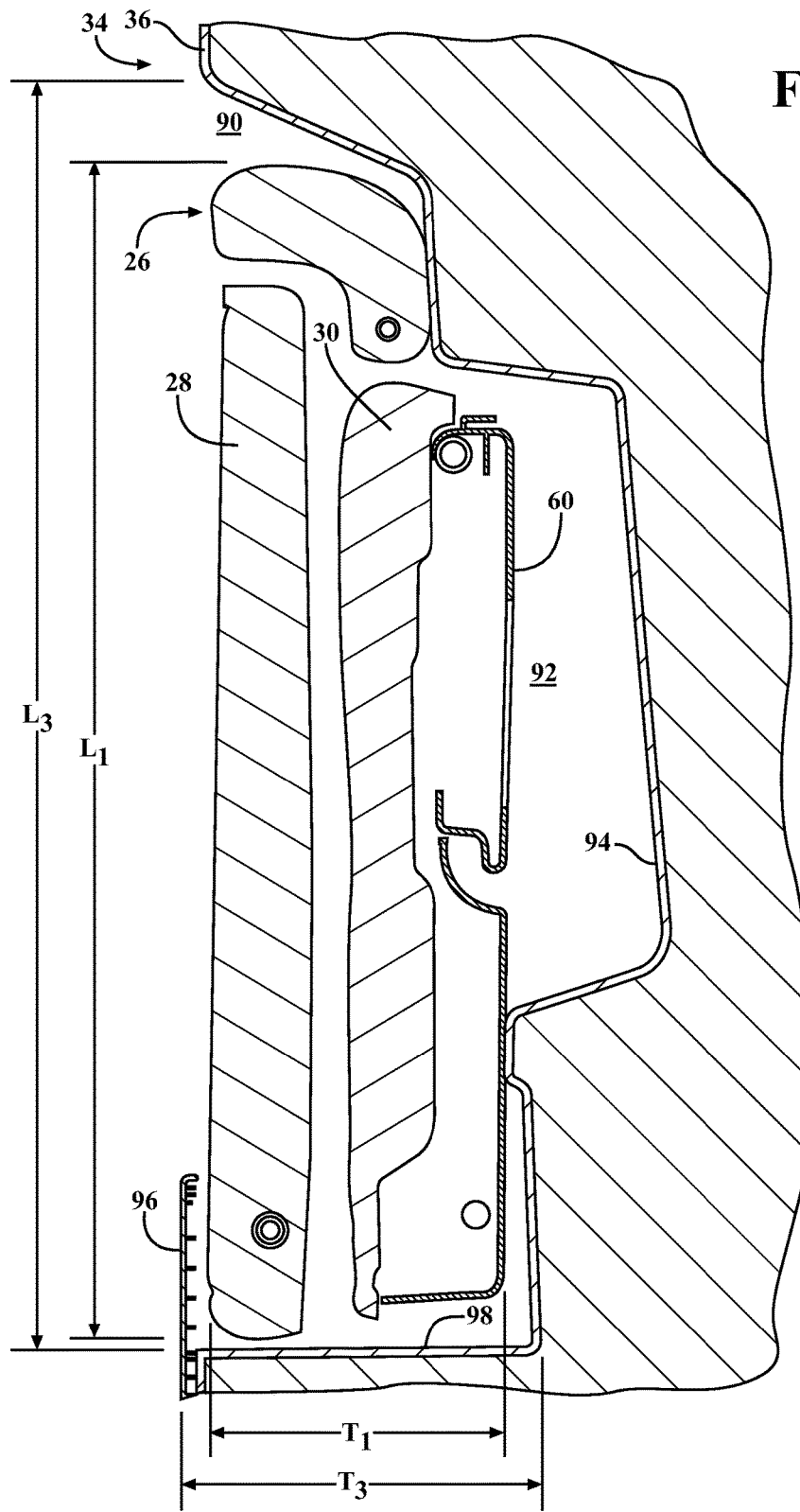
FIG. 7 is a cross-sectional view of the folded seat in the storage space.

The seat assembly 10 includes a stowable folding seat 26 that is releasably mounted to the mounting base 22. The stowable folding seat 26 includes a seatback 28 and a seat cushion 30. The stowable folding seat 26 is positioned between a seated position, as seen in FIG. 1A, and a stowed position, as seen in FIG. 7. In the seated position the seatback 28 and the seat cushion 30 are positioned generally normal so as to support an occupant. In the stowed position the seatback 28 extends generally parallel with the seat cushion 30.

The vehicle 14 further includes a center console 32 that is stored in a storage space 34, as seen in FIG. 1B, when the stowable folding seat 28 is mounted to the mounting base 22. In such a configuration, the stowable folding seat 26 is mounted to the seat assembly 10 and a center console 32 is stowed in the storage space 34 so as to not occupy any floor or subfloor cargo space in the vehicle 14.

With reference to FIG. 1B, the center console 32 is stored in the storage space 34 provided in the passenger compartment 12 of the automotive vehicle 14. The storage space 34 is provided in an interior side wall 36 of the passenger compartment, specifically, a cargo area 38. The center console 32 includes cup holders 32a and an open access storage compartment 32b to provide for additional storage for occupants seated in the seat assembly 10 when installed in the seat assembly 10.

However, in the vehicle configuration illustrated in FIGS. 1A and 1B, the stowable folding seat 26 is mounted to the seat assembly 10 and the separate center console 32 is stored within the storage space 34 provided in the interior side wall 36 of the passenger compartment 12 of the vehicle 14.

In order to provide occupants with a customizable interior, the stowable folding seat 26 and the center console 32 are interchangeable mountable to the mounting base 22 and stowable in the storage space 34. Specifically, one configuration in which the stowable folding seat 28 is mounted to the mounting base 22 and the center console 32 is stored in the storage space 34 is illustrated in FIGS. 1A and 1B.

Figure 2A:
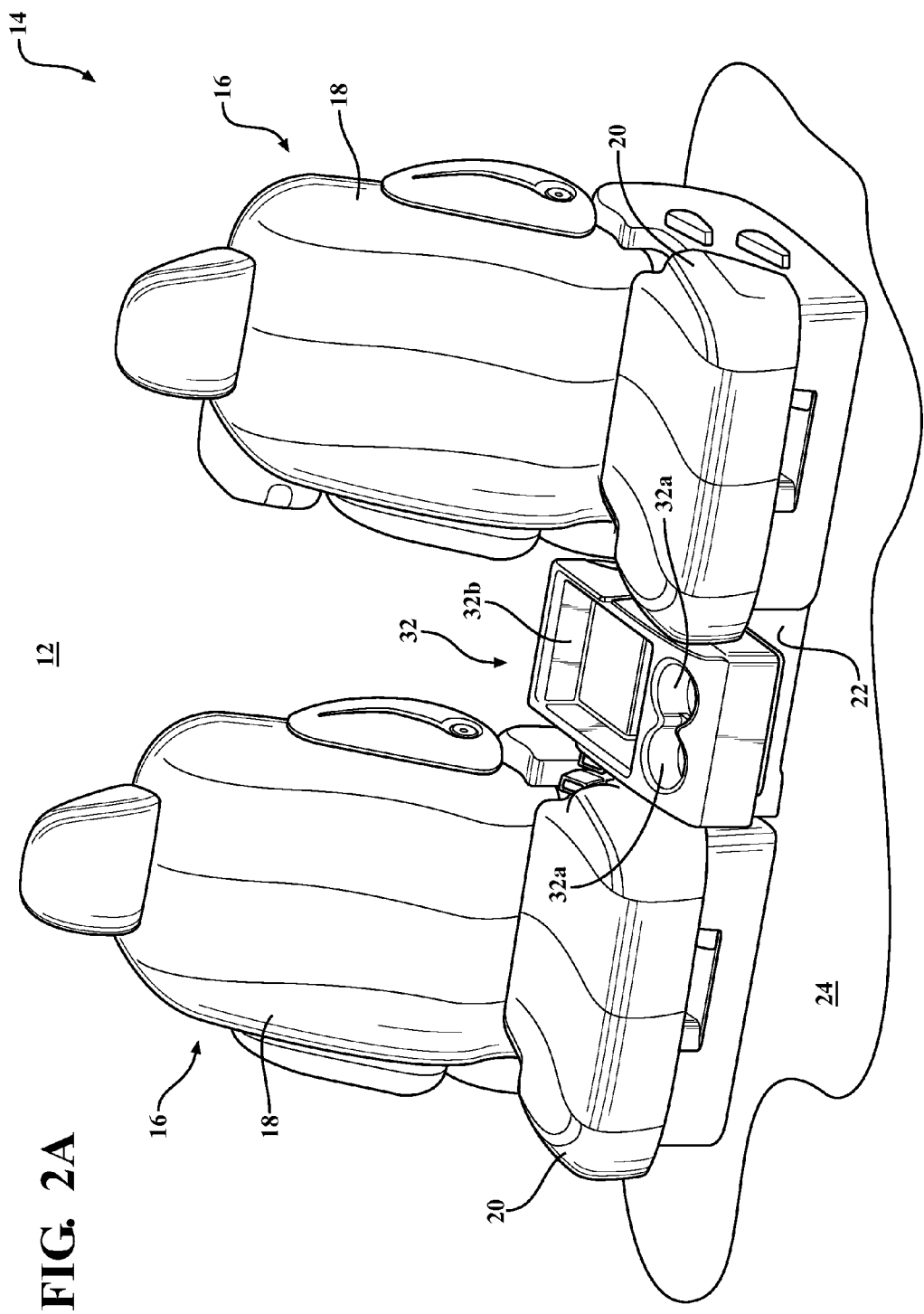
FIG. 2A is a front view of a seat assembly with the center console installed.
Figure 2B:
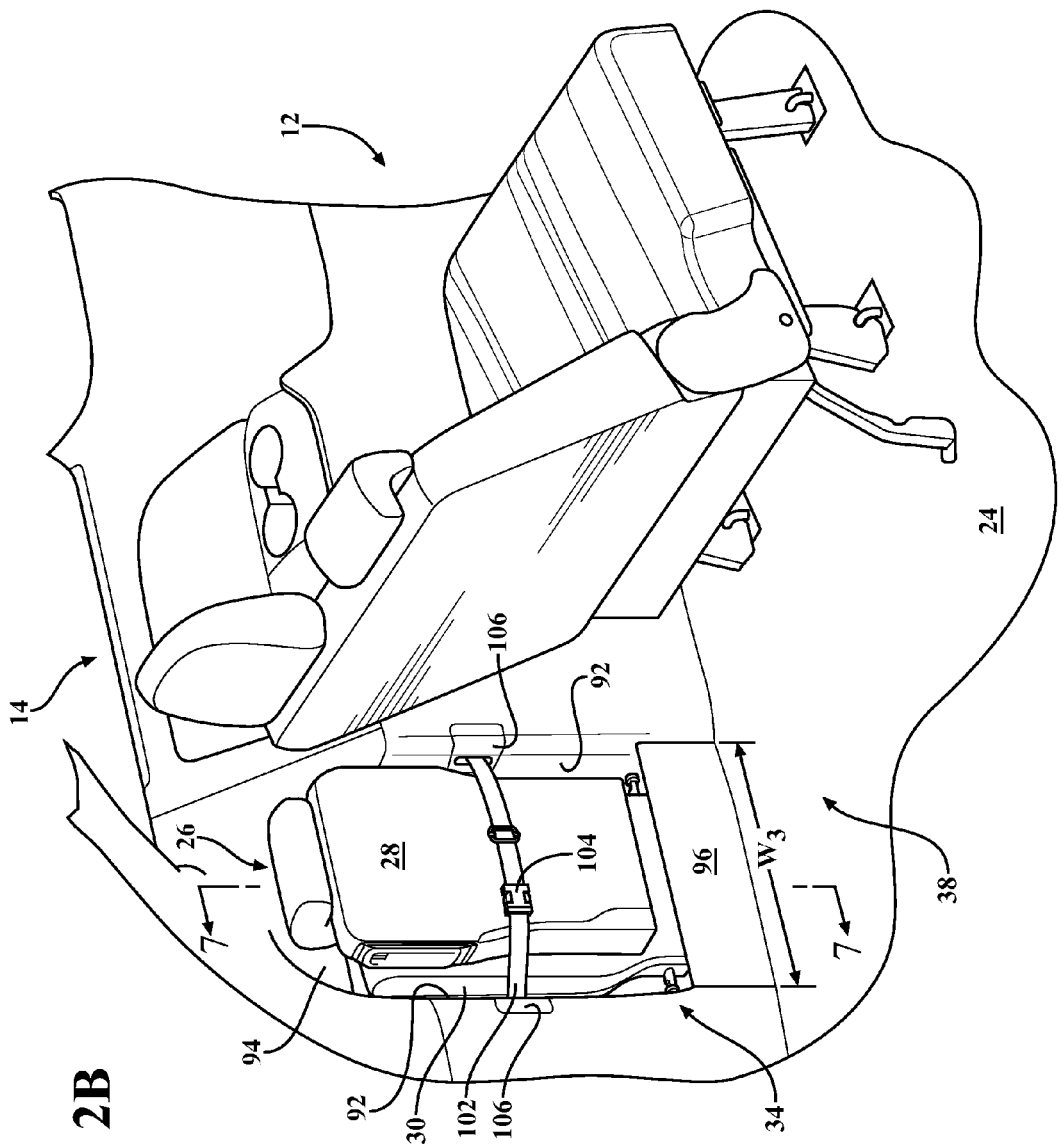
FIG. 2B is a perspective view of the storage space with the folding seat installed.

Alternatively, another configuration in which the center console 32 is mounted to the mounting base 22 and the stowable folding seat 28 is stored in the storage space 34 is illustrated in FIGS. 2A and 2B. Specifically, the center console 32 is mounted to the mounting base 22 of the seat assembly 10. The center console 32 is mounted between the pair of seats 16 so as to provide storage options for occupants. In the configuration in which the center console 32 is mounted to the seat assembly 10, the stowable folding seat 26 is stored, in the stowed position, within the storage space 34 provided in the interior side wall 36 of the passenger compartment 12.

Figure 3:
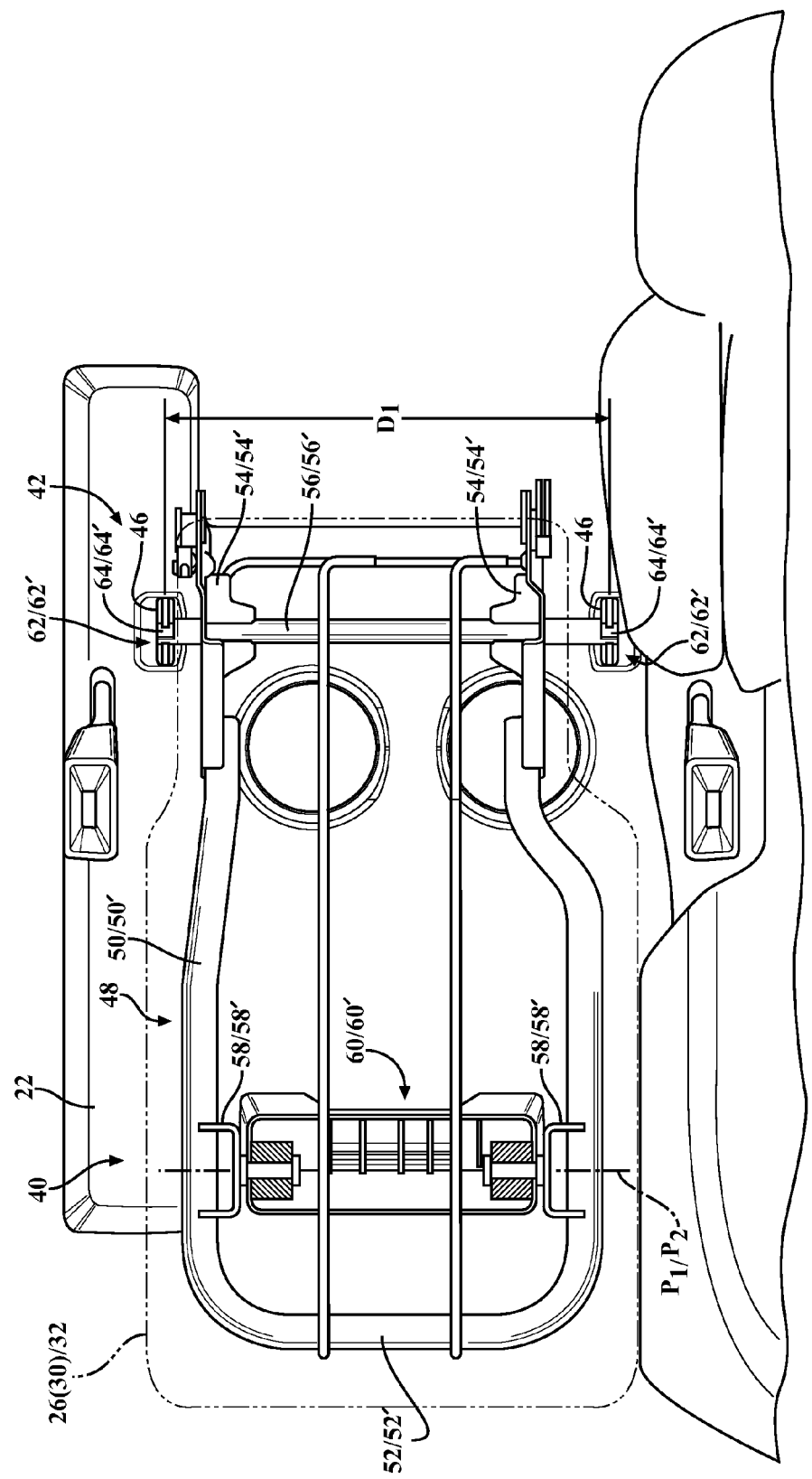
FIG. 3 is a top view of the mounting base of the seat assembly.

With reference to FIG. 3, the mounting base 22 includes a front mounting structure 40 and a rear mounting structure 42. As will be described in greater detail below, the front mounting structure 40 includes a latch 44 (best seen in FIGS. 4B and 5B). The rear mounting structure 42 includes a pair of mounting brackets 46. The pair of mounting brackets 46 are spaced apart a predetermined distance D1. Further, the latch 44 is spaced apart a first predetermined distance from an imaginary line traversing between the pair of mounting brackets 46.

In order for both the stowable folding seat 26 and the center console 32 to be mountable to the mounting base 22, specifically, the front mounting structure 40 and the rear mounting structure 42, the stowable folding seat 26 and the center console 32 are provided with a common mounting structure 48. The common mounting structure 48 that is common to both the stowable folding seat 26 and the center console 32 allows for the interchangeable attachment of the stowable folding seat 26 and the center console 32 to the mounting base 22 of the seat assembly. The common mounting structure 48 acts as both the console mounting structure and the seat mounting structure.

Figure 4A:
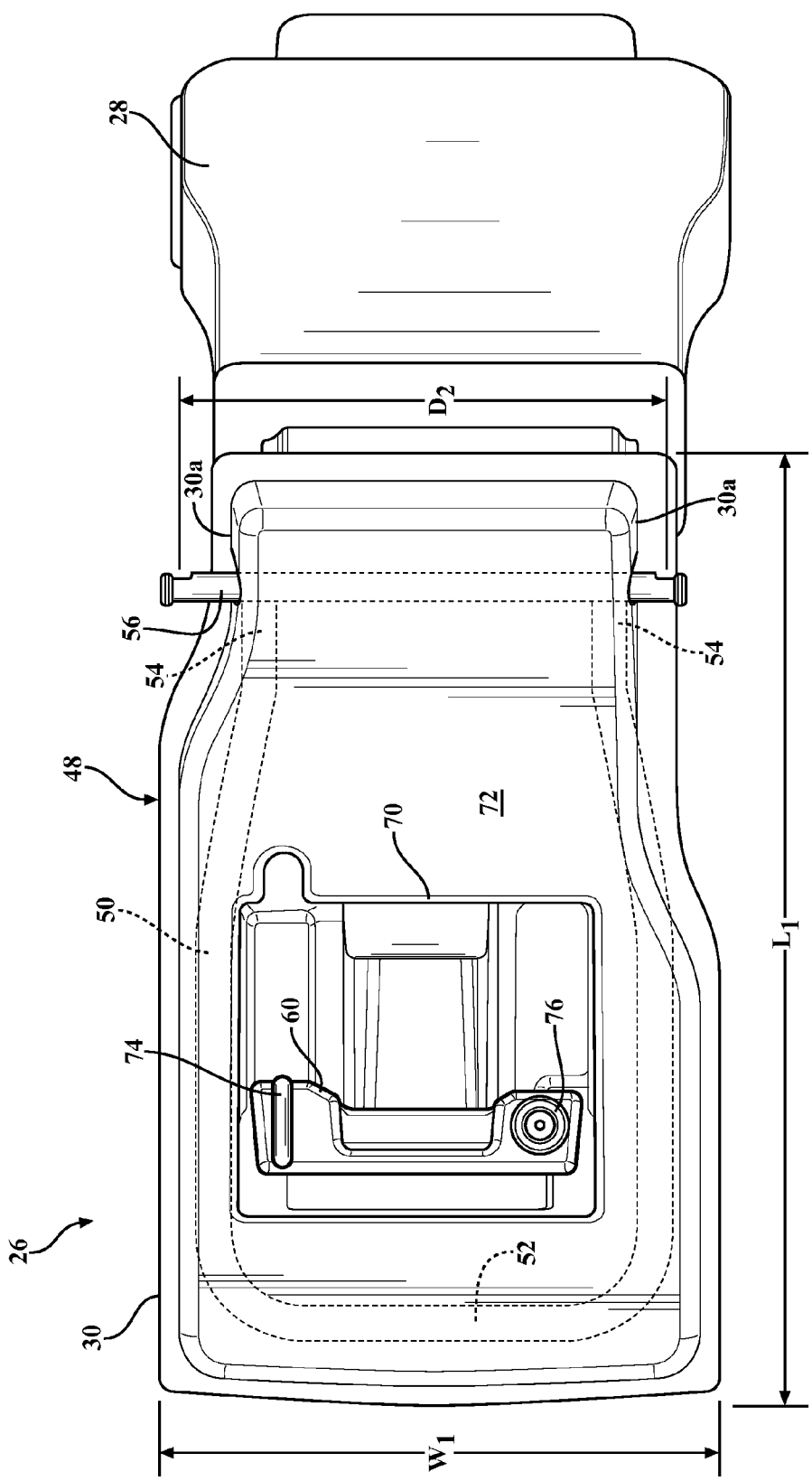
FIG. 4A is a bottom view of the folding seat.
Figure 4B:
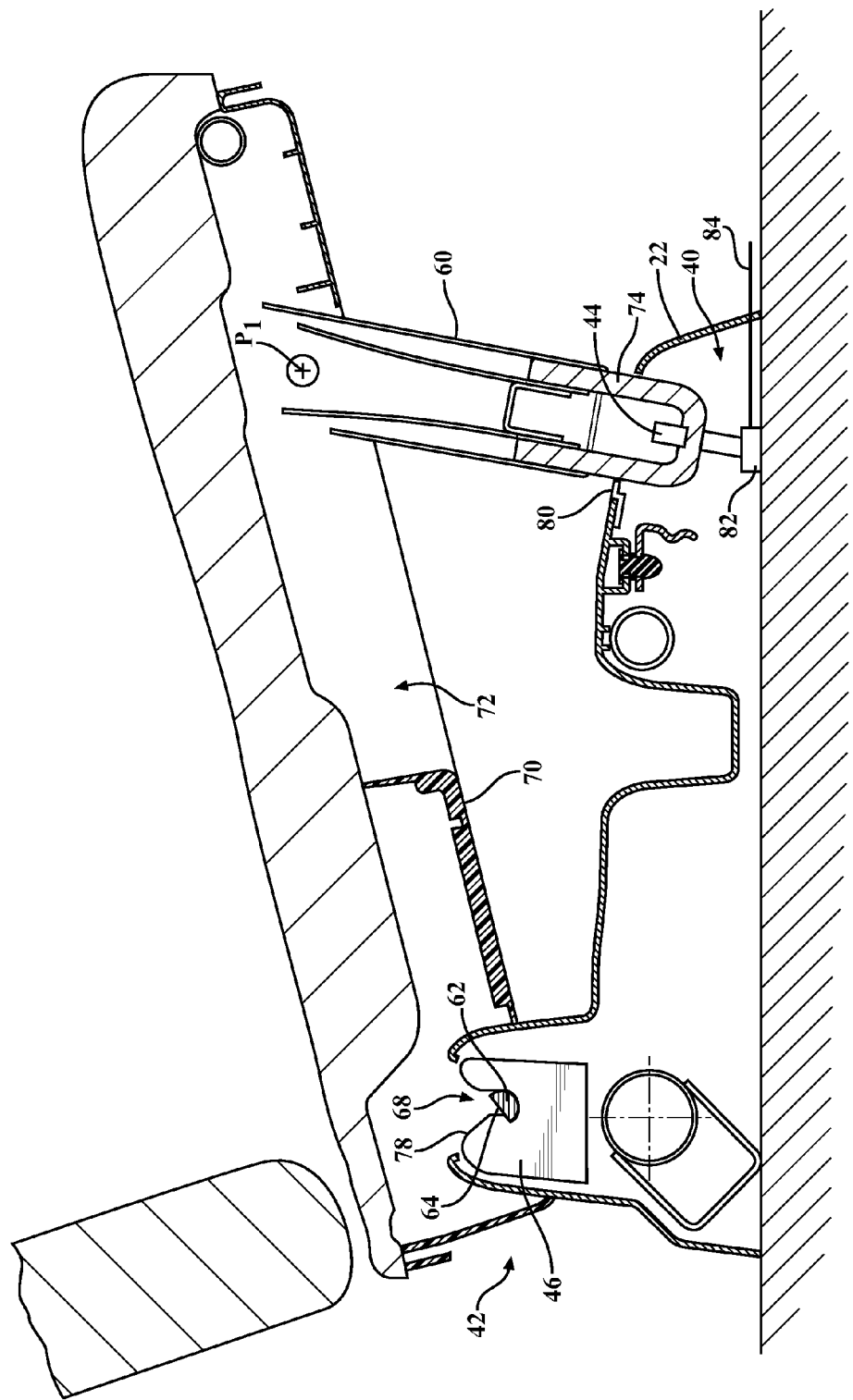
FIG. 4B is a cross-sectional view of the folding seat mounted to the mounting base of the seat assembly.

With reference to FIGS. 4A and 4B, the common mounting structure 48 of the stowable folding seat 26 will now be discussed. The common mounting structure 48 includes a generally U-shaped seat frame member 50. The generally U-shaped seat frame member 50 includes a closed end 52 and a pair of seat distal ends 54. The common mounting structure 48 further includes a seat attachment rod 56 that traverses across the pair of seat distal ends 54 of the generally U-shaped seat frame member 50. A pair of seat swing brackets 58 is provided between the seat closed end 52 and the pair of seat distal ends 54. The seat swing brackets 58 pivotally attach a seat hook structure 60 to the U-shaped seat frame member 50 such that the seat hook structure 60 is pivotal about a seat pivot axis P1.

The seat attachment rod 56 of the common mounting structure 48 includes a pair of seat attachment ends 62 having a shaped construction. Specifically, the seat attachment rod 56 is a cylindrical rod in which the seat attachment ends 62 include flattened cutouts 64. As will be described in greater detail below, the common mounting structure 48 of both the stowable folding seat 26 and the center console 32 is formed having a predetermined distance D2 distance between the attachment ends 62, specifically, the flattened cutouts 64.

The mounting of the stowable folding seat 26 to the mounting base 22 will be discussed. As illustrated in FIG. 4A, a portion of the seat attachment rod 56 adjacent the attachment ends 62 extending beyond side edges 30a of the seat cushion 30. An seat opening 70 is formed in a seat bottom surface 72 of the seat cushion 30 of the stowable folding seat 26. The seat opening 70 accommodates the pivotal movement of the seat hook structure 60 between an engaged and a stowed position.

As illustrated in FIG. 4B, the seat hook structure 60 is provided in the engaged position and extends outwardly from the seat bottom surface 72 of the seat cushion 30. As will be described in greater detail below, in the stowed position, the seat hook structure 60 is received within the seat opening 70 and extends at least partially flush with the seat bottom surface 72 of the seat cushion 30. The seat hook structure 60 includes a seat hook 74 provided at one end of the seat hook structure 60 and a seat bumper 76 provided at an opposite end.

Initially, the attachment ends 62 of the seat attachment rod 56 are received within the rear mounting structure 42. Specifically, the flattened cutouts 64 are received within a slot 68 formed in each of the pair of the mounting brackets 46.

Specifically, the shape configuration of the flatten cutouts 64 allows the attachment ends 62 to slide along a leading edge 78 of the mounting bracket 58 and into the slot 68. Upon engagement of the attachment end 62 of the seat attachment rod 56 within the slot 68 of the mounting bracket 58, the stowable folding seat 26 is secured to the rear mounting structure 42. Upon further rotation of the seat cushion 30, the seat hook structure 60, in the engaged position allows, the seat hook 74 to enter an opening 80 and engage with the latch 44 so as to secure the seat hook 74 to the front mounting structure 40 of the mounting base 22. Upon engagement of the seat hook 74 to the latch 44, the stowable folding seat 26 is mounted to the front mounting structure 40 of the mounting base 22.

The latch 44 is pivotally attached to a release mechanism 82 which upon actuation of a release strap 84 pivots the latch to disengage the latch 44 from the seat hook 74 to disengage the seat hook 74 from the front mounting structure 40.

As seen in FIG. 4A, the folding seat cushion 30, in the folded position, has an overall width of W1 and an overall length of L1. Further, the attachment ends 62 of the seat attachment rod 56 are spaced apart by the predetermined distance D2 which is equal to the predetermined distance D1 between the mounting brackets 46 of the rear mounting structure 42. Further, the seat hook 74, in the engaged position is spaced apart a second predetermined distance from the seat attachment rod 56. The second predetermined distance is equal to the first predetermined distance.

Figure 5A:
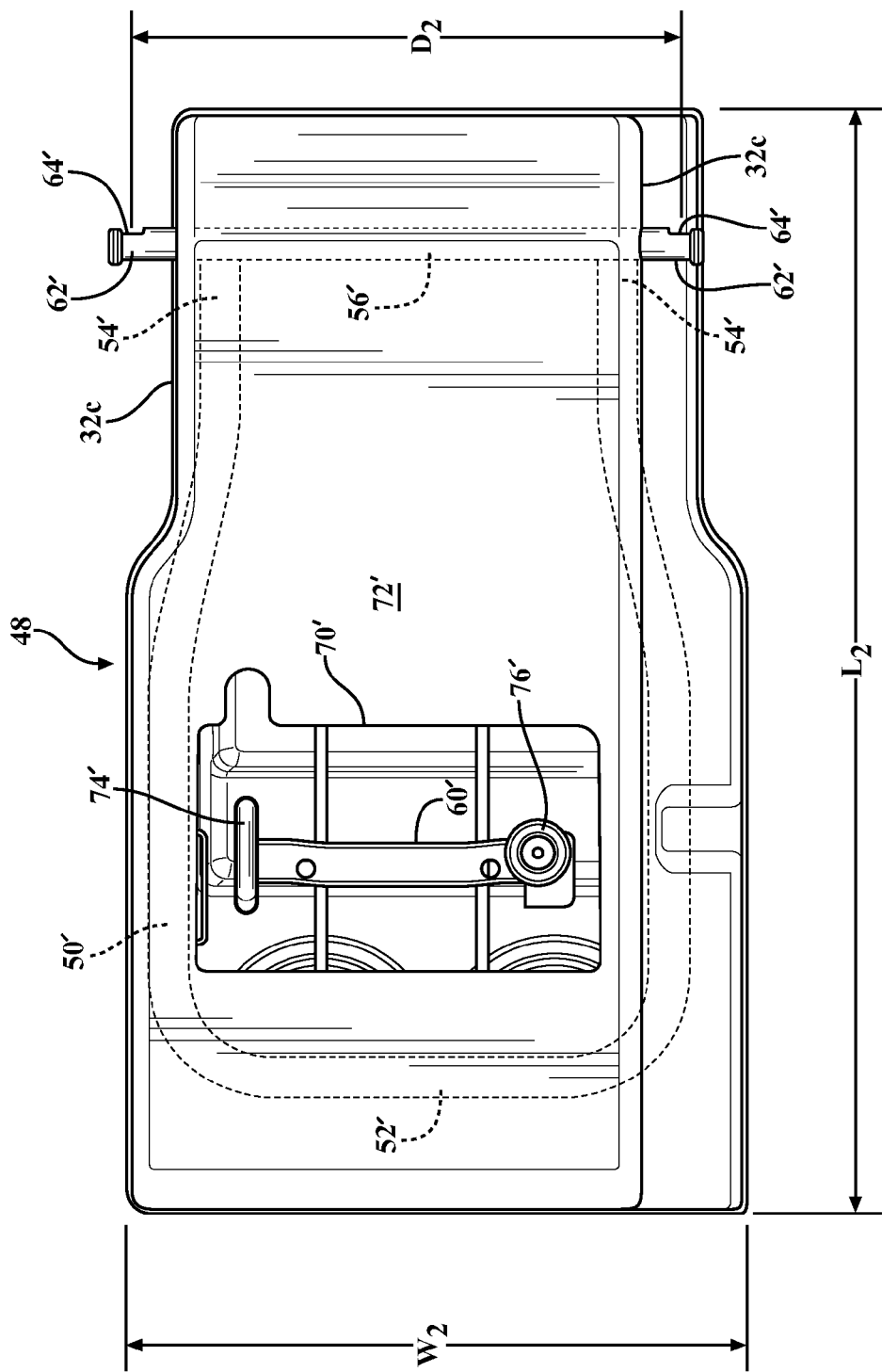
FIG. 5A is a bottom view of the center console.
Figure 5B:
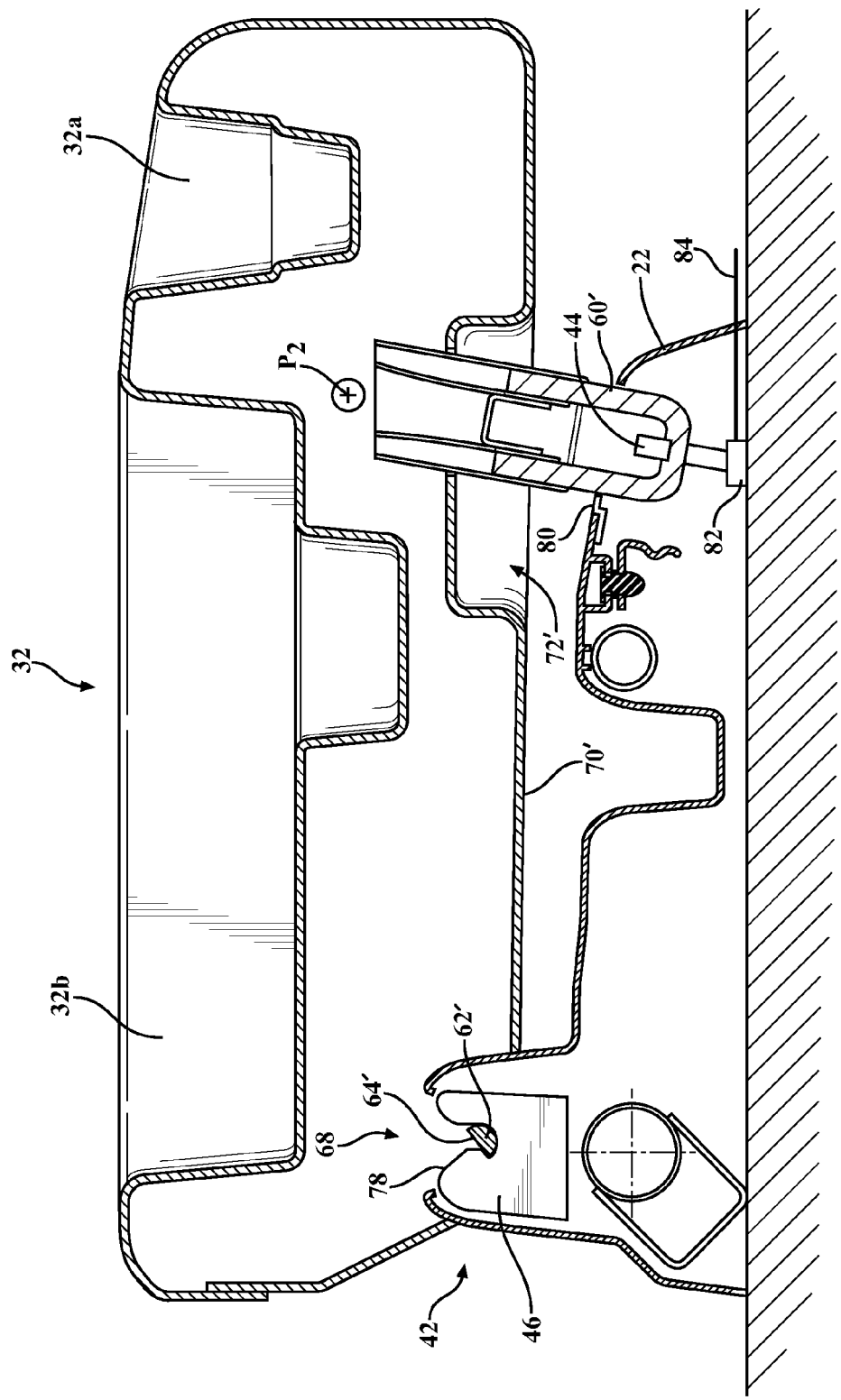
FIG. 5B is a cross-sectional view of the center console mounted to the mounting base of the seat assembly.

With reference to FIGS. 5A and 5B, the mounting of the center console 32 to the mounting base 22 will be discussed. The common mounting structure 48 includes a generally U-shaped console frame member 50'. The generally U-shaped console frame member 50' includes a closed end 52' and a pair of console distal ends 54'. The common mounting structure 48' further includes a console attachment rod 56' that traverses across the pair of console distal ends 54' of the generally U-shaped console frame member 50'. A pair of console swing brackets 58' is provided between the console closed end 52' and the pair of console distal ends 54'. The console swing brackets 58' pivotally attach a console hook structure 60' to the U-shaped console frame member 50' such that the console hook structure 60' is pivotal about a console pivot axis P2.

The mounting of the center console 32 to the mounting base 22 will be discussed. As illustrated in FIG. 5A, a portion of a console attachment rod 56' adjacent the attachment ends 62' extending beyond side edges 32c of the center console 32. A console opening 70' is formed in a console bottom surface 72' of the center console 32. The console opening 70' accommodates the pivotal movement of the console hook structure 60' between an engaged and a stowed position.

As illustrated in FIG. 5B, the console hook structure 60' is provided in the engaged position and extends outwardly from the console bottom surface 72' of the center console 32. As will be described in greater detail below, in the stowed position, the console hook structure 60' is received within the console opening 70' and extends at least partially flush with the console bottom surface 72' of the center console 32. The console hook structure 60' includes a console hook 74' provided at one end of the console hook structure 60' and a console bumper 76' provided at an opposite end.

As illustrated in FIG. 5B, the mounting of the center console 32 to the mounting base 22 will now be explained. Initially, the pair of console attachment ends 62' of the console attachment rod 56' are received within the rear mounting structure 42. Specifically, the flattened cutouts 64' are received within a slot 68 formed in each of the pair of the mounting brackets 46.

Specifically, the shape configuration of the flatten cutouts 64' allows the attachment ends 62' to slide along a leading edge 78 of the mounting bracket 46 and into the slot 68. Upon engagement of the attachment end 62' of the console attachment rod 56' within the slot 68 of the mounting bracket 58, the center console 32 is secured to the rear mounting structure 42. Upon further rotation of the center console 32, the console hook structure 60', in the engaged position allows, the console hook 74' to enter the opening 80 and engage with the latch 44 so as to secure the console hook 74' to the front mounting structure 40 of the mounting base 22. Upon engagement of the console hook 74' to the latch 44, the center console 32 is mounted to the front mounting structure 40 of the mounting base 22.

Upon actuation of the release strap 84, the latch 44 pivots to disengage the latch 44 from the console hook 74' to disengage the center console 32 from the front mounting structure 40.

As seen in FIG. 5A, the center console 32 has an overall width of W2 and an overall length of L2. Further, the attachment ends 62 of the console attachment rod 56' on the center console 32 are spaced apart by a predetermined distance D3 which is equal to the predetermined distance D1 between the mounting brackets 46 of the rear mounting structure 42.

Further, the Further, the console hook 74', in the engaged position is spaced apart a third predetermined distance from the console attachment rod 56'. The third predetermined distance is equal to the first predetermined distance and the second predetermined distance.

Figure 6:
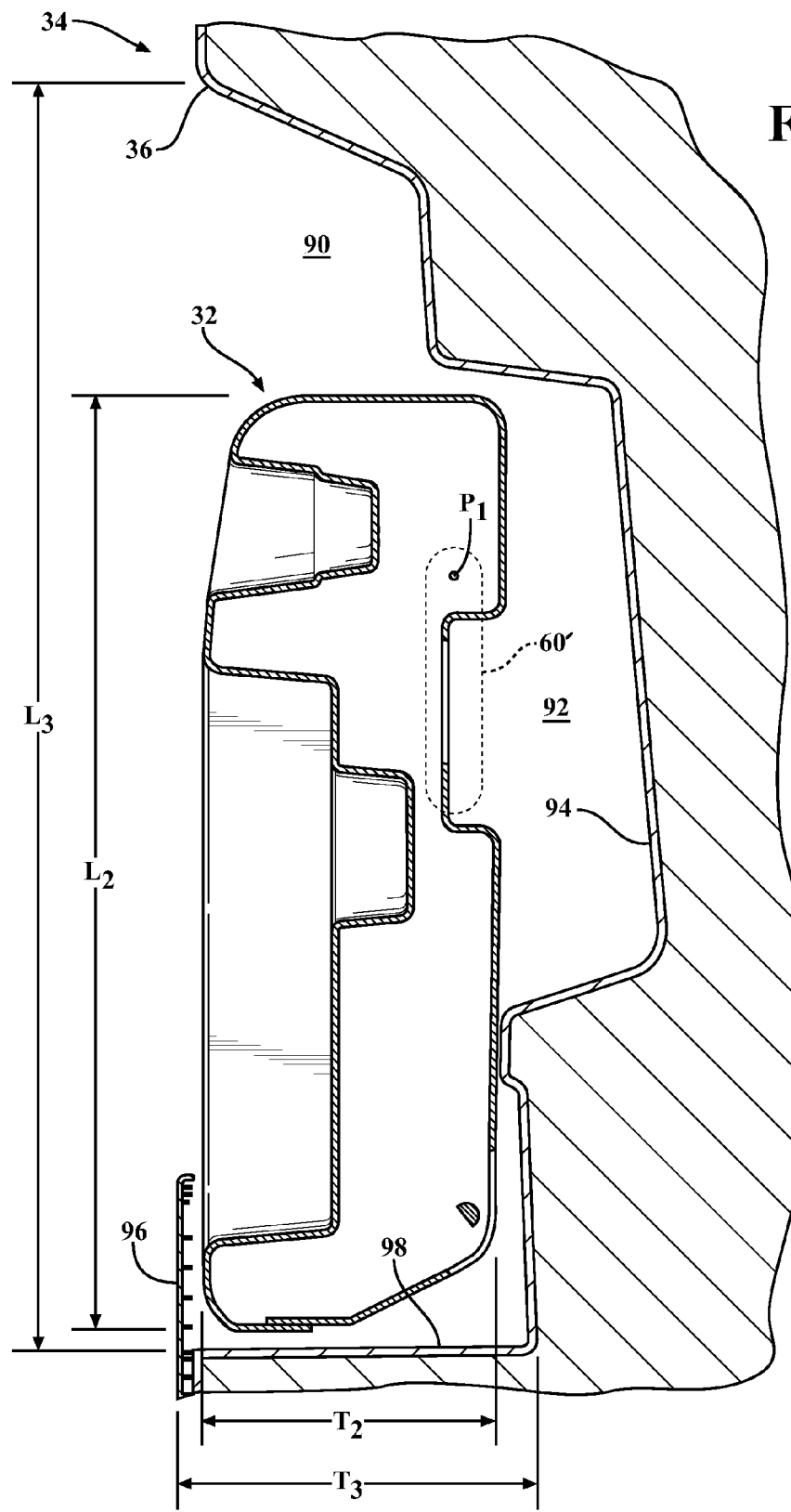
FIG. 6 is a cross-sectional view of the center console in the storage space.

With reference to FIG. 6, the storage of the center console 32 within the storage space 34 will now be discussed. FIG. 6 is a cross-sectional view taken along 6-6 of FIG. 1B. As shown in FIG. 6, the storage space 34 is formed in an interior side wall 36 of the passenger compartment 12. The storage space 34 is formed as a recess 90 having a pair of side walls 92, an inner wall 94, an outer wall 96, and a lower wall 98 that traverses between the inner wall 94 and the outer wall 96. The recess 90 is provided with a predetermined dimension in the depth (thickness), length, and width directions.

Specifically, as illustrated in FIG. 6, the recess 90 includes a thickness T3 that is greater than a thickness T2 of the center console 32. The recess 90 is provided with a predetermined length L3 that is greater than the predetermined length L2 of the center console 32 and as seen in FIG. 5A. As seen in FIG. 1B, the recess 90 is provided with a width W3 that is greater than a width W2 of the center console 32.

Due to the predetermined dimensions of the recess 90 having a width W3, length L3, and thickness T3 that is greater than the width W2, length L2, and thickness T2 of the center console, the storage space 34 is configured to receive and store the center console 32. Specifically, the thickness T3 of the recess 90 is provided as the inner wall 94 is spaced apart the thickness T3 from the outer wall 96 such that upon receiving the center console 32, a portion of the center console 32 is positioned between the inner wall 94 and the outer wall 96.

With reference to FIG. 7, the storage of the stowable folding seat 26 within the storage space 34 will now be discussed. FIG. 7 is a cross-sectional view taken along 7-7 of FIG. 2B. As shown in FIG. 7, the recess 90 includes a thickness T3 that is greater than a thickness T1 of the stowable folding seat 26. The recess 90 is provided with a predetermined length L3 that is greater than the predetermined length L1 of the stowable folding seat 26 as seen in FIG. 5A. As seen in FIG. 2B, the recess 90 is provided with a width W3 that is greater than a width W2 of the center console 32.

Due to the predetermined dimensions of the recess 90 having a width W3, length L3, and thickness T3 that is greater than the width W1, length L1, and thickness T1 of the stowable folding seat 26, the storage space 34 is configured to receive and store the stowable folding seat 26. Specifically, the thickness T3 of the recess 90 is provided as the inner wall 94 is spaced apart the thickness T3 from the outer wall 96 such that upon receiving the stowable folding seat 26, a portion of the stowable folding seat 26 is positioned between the inner wall 94 and the outer wall 96.

With reference to FIGS. 1B and 2B, the storage space 34 is provided with a storage member 102 to hold either the stowable folding seat 26 or the center console 32 within the recess 90 for the purposes of storing and preventing rattling of the stowable folding seat 26 and the center console 32. The storage member 102 can be any storage member known to those skilled in the art that would provide for securing the stowable folding seat 26 or the center console 32 at least partially within the recess 90 and abutting the inner wall 94.

For illustrative purposes only, the storage member 102 can be a strap, cord, arm, and the like. In addition, the storage member 102 can have an attachment and/or release member 104, for example, a buckle, and be fixedly attached to the interior side wall 36 at an attachment point 106. For example, the storage member 102 can be fixedly secured to the interior side wall 36 at storage points 108 using threaded fasteners, welding, sewing, adhesive, and the like.

It is appreciated that the vehicle 14 provides a customizable passenger compartment 12 in which the user can interchangeably mount the folding stowable seat 26 or the center console 32 to the seat assembly and store the other of the stowable folding seat 26 or the center console 32 in the storage space 34 so as to provide the required additional seating or storage at the seat assembly without occupying any floor or subfloor cargo space with the other of the stowable folding seat 26 or the center console 32.

It is appreciated, of course, that the vehicle 14 can be a minivan, full-sized van, SUV, bus, and the like.

The interior side wall 36 can be an interior trim panel and may or may not be an interior quarter trim panel. In some instances, the interior side wall 36 is a rear quarter trim panel, e.g. a left quarter trim panel or a right quarter trim panel in a cargo area 38 of the passenger compartment 12. However, the storage space is not limited to a cargo area 38.

The foregoing drawings, discussion, and description are for illustrative purposes only. As such, the specific embodiments are not meant to be limitations upon the practice thereof. Numerous modifications and variations of the invention will be readily apparent to those skilled in the art in view of the teaching presented herein. As such, it is the following claims, including all equivalents, which define the scope of the invention.

It is claimed:

1. A vehicle comprising:
a passenger compartment having a storage space, the storage space provided in an interior side wall of the passenger compartment;
a seat assembly provided in the passenger compartment, the seat assembly having a mounting base;
a folding seat having a seat mounting structure, the folding seat moveable between a folded position and seated position; and
a center console having a console mounting structure;
the folding seat and the center console are each configured to be stored within the storage space of the passenger compartment,
the seat mounting structure of the folding seat and the console mounting structure of the center console are interchangeably mounted to the mounting base of the seat assembly.

2. The vehicle of claim 1, wherein the mounting base includes a front mounting structure and a rear mounting structure, and wherein the seat mounting structure and the console mounting structure each correspond to the front mounting structure and the rear mounting structure of the mounting base so as to be releasably attachable to the mounting base.

3. The vehicle of claim 2, wherein the storage space is provided with a predetermined dimension in a length, thickness, and width directions, and wherein both the folding seat and the center console are dimensioned to fit within the predetermined dimension of the storage space.

4. The vehicle of claim 3, wherein the front mounting structure of the mounting base includes a latch, and the rear mounting structure of the mounting base includes a pair of mounting brackets.

5. The vehicle of claim 4, wherein the folding seat includes a seat attachment rod having a pair of seat attachment ends and a seat hook, the pair of seat attachment ends engage within the pair of mounting brackets of the rear mounting structure of the mounting base, the seat hook engages with the latch of the front mounting structure of the mounting base,
wherein the center console includes a pair of console attachment ends and a console hook, the pair of console attachment ends engage within the pair of mounting brackets of the rear mounting structure of the mounting base, the console hook engages with the latch of the front mounting structure of the mounting base.

6. The vehicle of claim 5, wherein the storage space is formed as a recess in an interior trim panel of the vehicle, the recess includes an inner wall, a lower wall, and an outer wall.

7. The vehicle of claim 6, wherein the outer wall is spaced a predetermined distance from the inner wall, and wherein the lower wall traverses the predetermined distance between the inner wall and the outer wall.

8. The vehicle of claim 7, wherein the center console is configured to be received within the storage space such that a portion of the center console is positioned between the inner wall and the outer wall,
wherein the folding seat, in the folded position, is configured to be received within the storage space such that a portion of the folding seat is positioned between the inner wall and the outer wall.

9. The vehicle of claim 8, wherein the seat hook of the seat mounting structure is pivotal about a seat pivot axis between a stored position and an extended position, the seat hook is positioned in the extended position when the seat mounting structure of the folding seat is mounted to the mounting base such that the pair of seat attachment ends are received within the pair of mounting brackets and the seat hook engages with the latch, the seat hook is positioned in the stored position when the folding seat is stored within the storage space,
wherein the console hook of the console mounting structure is pivotal about a console pivot axis between a stored position and an extended position, the console hook is positioned in the extended position when the console mounting structure of the center console is mounted to the mounting base such that the pair of console attachment ends are received within the pair of mounting brackets and the console hook engages with the latch, the console hook is positioned in the stored position when the center console is stored within the storage space.

10. The vehicle of claim 9, wherein the folding seat includes a U-shaped seat frame member, the pair of seat attachment ends are formed on a seat attachment rod mounted to the U-shaped seat frame member,
wherein the center console includes a U-shaped console frame member, the pair of console attachment ends are formed on a console attachment rod mounted to the U-shaped console frame member.

11. The vehicle of claim 5, wherein the pair of mounting brackets are spaced a first predetermined distance apart, the seat attachment ends are spaced a second predetermined distance apart, the console attachment ends are spaced a third predetermined distance apart, and
wherein the first predetermined distance, the second predetermined distance and the third predetermined distance are equal.

12. The vehicle of claim 1, wherein the mounting base is attached to a vehicle floor.

13. The vehicle of claim 1, wherein the seat assembly includes a pair of seats and the mounting base is positioned between the pair of seats.

14. The vehicle of claim 1, wherein the seat mounting structure of the folding seat and the console mounting structure of the center console are each configured to be removably mounted to the mounting base.

* * * * *